J. W. MORRISON AND T. W. HOLT.
DOUBLING, TWISTING AND WINDING, AND LIKE FRAME.
APPLICATION FILED OCT. 4, 1919.
1,382,217.
Patented June 21, 1921.
3 SHEETS—SHEET 2.
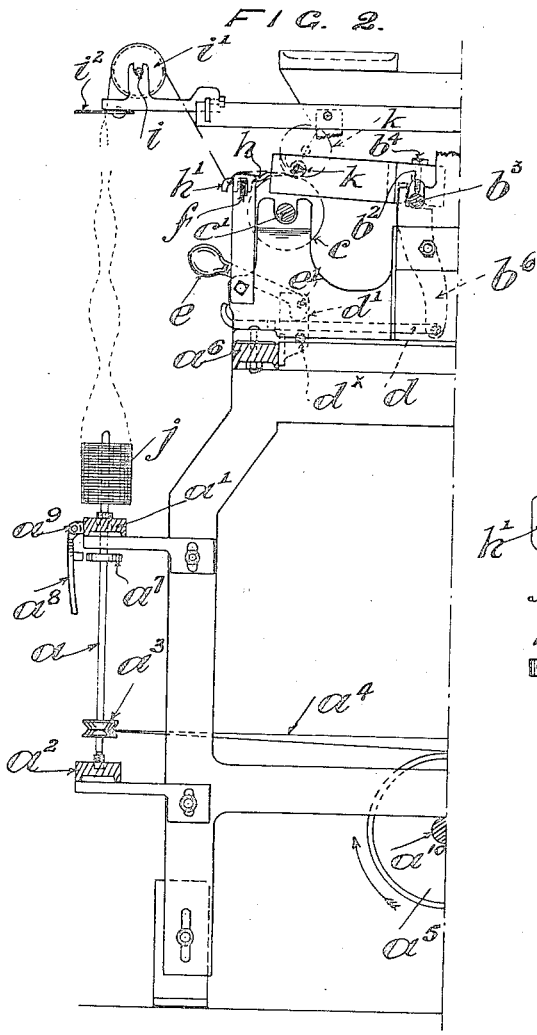
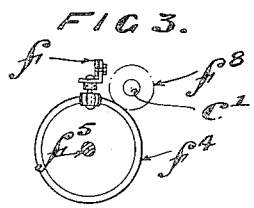
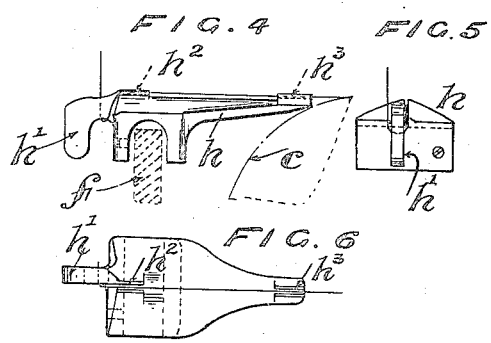
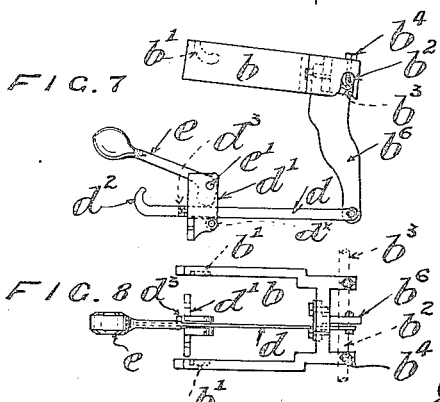
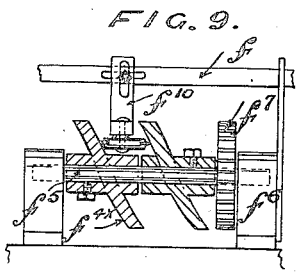
INVENTORS:
James William Morrison
Thomas William Holt
By Wm Wallace White
ATTY.

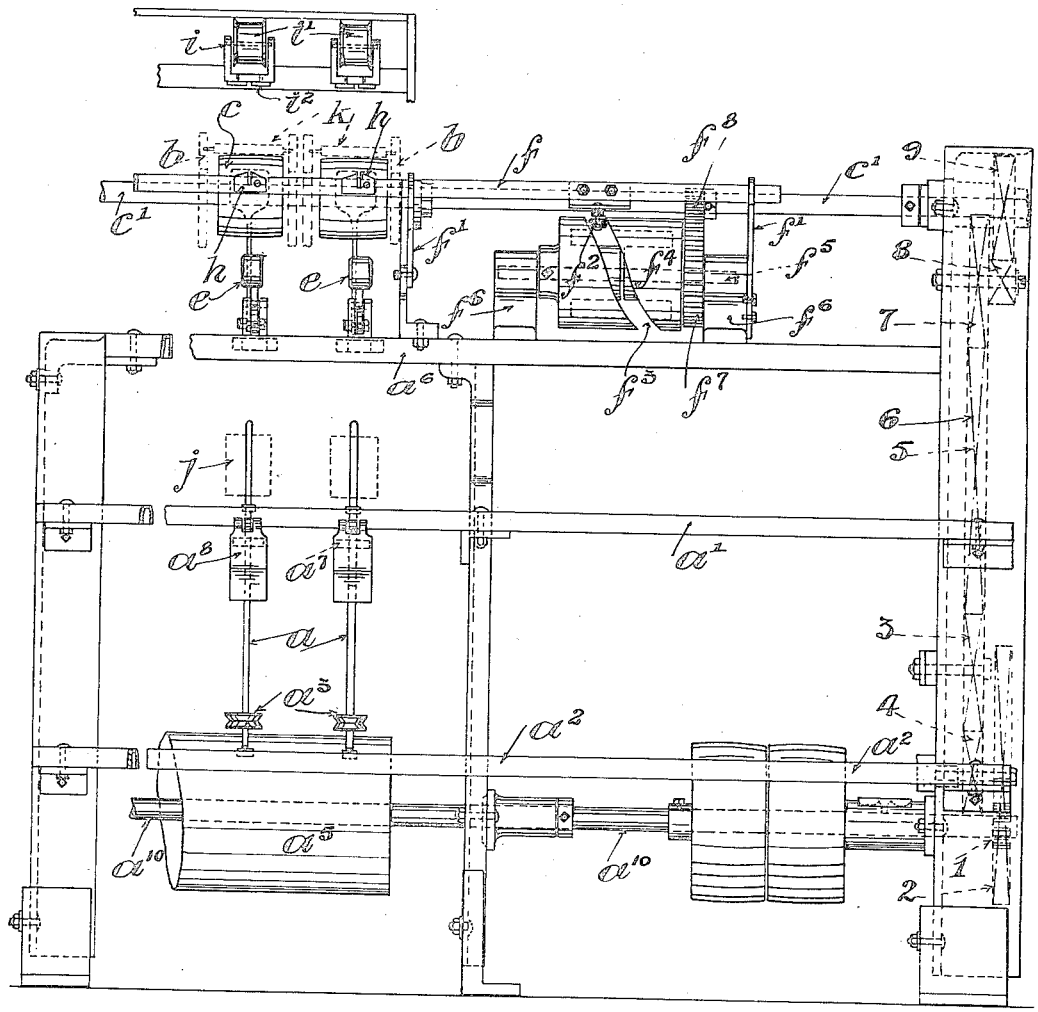

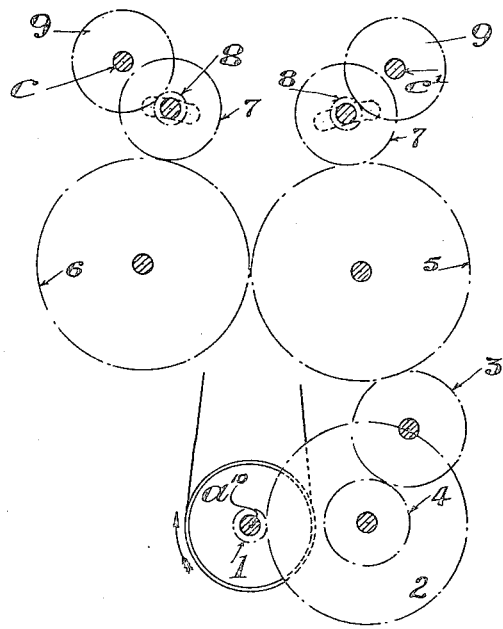
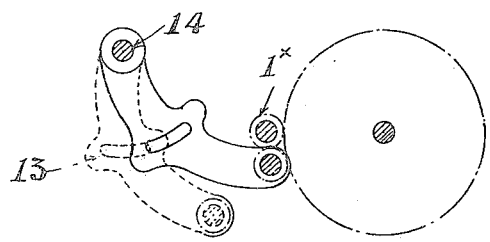
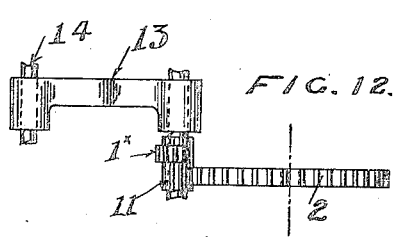
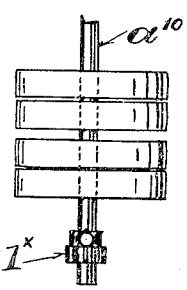

UNITED STATES PATENT OFFICE.

JAMES WILLIAM MORRISON AND THOMAS WILLIAM HOLT, OF STALEYBRIDGE, ENGLAND.

DOUBLING, TWISTING, AND WINDING, AND LIKE FRAME.

1,382,217.  Specification of Letters Patent.  Patented June 21, 1921.

Application filed October 4, 1919. Serial No. 328,481.

*To all whom it may concern:*

Be it known that we, JAMES WILLIAM MORRISON and THOMAS WILLIAM HOLT, subjects of the King of Great Britain and Ireland, both residing at Staleybridge, in the county of Chester, England, have invented new and useful Improvements in Doubling, Twisting, and Winding, and like Frames, of which the following is a specification.

This invention relates to improvements in or connected with doubling, twisting and winding, and like frames for dealing with fibrous or other yarns.

The object in view is, to produce a frame which can be run at a very high speed and which eliminates the use of a machine such as a cheese winder or double flanged bobbin winder in the production of doubled and twisted yarns wound in cheese form or on doubled flanged bobbins or the like. The frame may also be used for imparting additional twist to single yarns.

The attached drawings illustrate our improvements, and, in said drawings:—

Figure 1 is a front elevation of a doubling, twisting and winding frame made in accordance with our invention, broken in length and with certain omissions.

Fig. 2 is a half sectional elevation, it being understood that the frame is double-sided.

Fig. 3 is a detail of the traverse bar, its bowl and actuating cam, etc.

Figs. 4, 5 and 6 are respectively a side, an end and a plan view of the traversing yarn guide fitted to the traverse bar.

Figs. 7 and 8 are respectively a side view and a plan of one of the fulcrumed or swing frame or weighted cheese supports together with its locking or weighted lever combination, one group being used for each spindle.

Fig. 9 is a sectional detail indicating a modified construction of cam for working the traverse bar which carries the yarn guides.

Fig. 10 shows a diagram of one arrangement of gear wheels for the frame end, and which are also seen in Fig. 1.

Figs. 11, 11$^a$ and 12 are diagrams indicating a simple way of reversing the direction of rotation of the tin roller according to whether it is desired to run twist-way or weft way.

We make use of spindles $a$ somewhat like mule spindles and these are supported in bearings in two rails $a'$, $a^2$, arranged low down along the sides of the frame, the two rails on each side being supported by brackets bolted to the frame-work. The spindles are each provided with a wherve $a^3$ and are driven by cords $a^4$ from a centrally placed tin roller $a^5$. Such spindles can be run at a very high speed, but to allow of their use, it is necessary to employ, in connection with each spindle, a weighting or locking motion in combination with a swing frame (which frame supports the short spindle or tube holder forming the driven support to receive the doubled twisted yarn and produce the cheese) and such swing frame and weighting or locking motion must be one which shall insure a steady frictional pressure of the receiving tubes or bobbins or the like on the frictional drums. For this purpose the ordinary latch and catch arrangement is useless, as such does not insure a certain and uniform pressure on the cheese or the like being wound, but allows the same to jump or vibrate, so that under high speed not only is the twist imparted uneven but the cheeses are not round, and winding is difficult.

We use an arrangement which gives a steady maximum pressure of the cheese on the friction drum and a pressure which remains substantially uniform. We accomplish our object by using a fulcrumed swing frame and a locking or weighted lever combination, which combination, while it allows of the swing frame being readily lifted, yet serves on release to weight and hold the swing frame and its cheese tube or the like with a satisfactory and uniform pressure whereby the take-up or winding on is uniform, the yarn being dealt with at a constant speed thus insuring an even twist.

In connection with each spindle we use a swing frame $b$ of cast metal which has recesses or slots $b'$, $b'$ to receive the spindle for the tube or bobbin for the cheese or the like to be pressed on its friction drum $c$, the friction drums $c$ being short truly cylindrical drums, one to each spindle, said line of drums being mounted on a shaft $c'$ supported in bearings and driven through a gear wheel in the end of the frame. Each swing frame has gaps or slots $b^2$, $b^2$ formed in the side members which gaps engage upon a longitudinal fulcrum bar or rod $b^3$ which serves as a fulcrum support. Studs $b^4$ are fitted on each swing frame, which studs can be adjusted to bear on the bar $b^3$ the same allowing of accurate and independent setting of the two side members of each swing frame on the fulcrum bar or rod $b^3$, as also of a variation in setting in case it be desired to wind small cones of yarn. The studs also prevent wear of the gaps and are readily renewable and simple to work.

Each swing frame $b$ has a pendent arm $b^6$ cast therewith, or bolted thereto as shown in the drawings. To each pendent arm $b^6$ is pivoted a slidable bar $d$ which passes through a slotted guide bracket $d'$ bolted to the longitudinal rail $a^6$, each slidable bar $d$ having a shaped extremity $d^2$ and a stop $d^3$ which regulates the lowest position of the swing frame. Each guide bracket $d'$ has an anti-friction roller $d^x$ and is shaped to receive a cranked and loaded lever $e$ fulcrumed at $e'$, the nose of such loaded lever being shaped to grip the slidable bar $d$ and consequently to load the swing frame $b$. By pulling out the slidable bar $d$, the swing frame $b$ can be raised instantly, but, no matter what position the swing frame lies in, the action of the loaded cranked lever $e$ locks same automatically and will only permit an outward sliding movement of the slidable bar $d$ as the cheese grows in diameter. Thus as the cheese grows in size, the lever mechanism permits the lifting of the swing frame $b$, but yet maintains a satisfactory and uniform pressure of each cheese or the like on its friction drum $c$. Easy manual raising is also insured, the attendant only requiring to pull out the slidable bar $d$, the position being maintained at any time by the loaded cranked lever $e$.

We use a traverse bar $f$ mounted to slide in brackets $f'$, the bar having an anti-friction roller $f^2$ secured thereon (see Figs. 1 and 3), and this roller engages a slot $f^3$ in the cam $f^4$ mounted on a shaft $f^5$ carried in bearings $f^6$, $f^6$ the cam having a spur pinion $f^7$ combined therewith and being driven by a small spur wheel $f^8$ fixed on the shaft $c'$. Any other similar cam combination may be used, as for instance the arrangement illustrated by Fig. 9 where a cam $f^{4x}$ of a different form is shown acting upon an adjustable device $f^{10}$ which may be provided with anti-friction rollers, the device $f^{10}$ being carried on the traverse bar $f$. By moving the adjustable device $f^{10}$ nearer to or farther from the axis of the cam a variation in length of traverse of the bar $f$ is obtainable.

Upon the traverse bar $f$ we fix yarn guides $h$, which are well shown in Figs. 4, 5 and 6, using one to each cheese, the yarn being passed over the hook-shaped curved finger $h'$ and then passing along the channels or gaps $h^2$, $h^3$ to the cheese. By the simple act of passing the yarn over the curved finger $h'$ the yarn, on the traverse of the bar, at once runs automatically into the channels or gaps $h^2$, $h^3$ without effort from the attendant, the guide $h$ being in effect self-threading. At present, we are using an overhead or upper yarn guiding combination consisting of axles $i$ each with a small revoluble flanged sheet metal drum $i'$ and flat metal clearer plate $i^2$, but this may be varied.

The package carrier or yarn supply (say of two ends not twisted together) is marked $j$ and is mounted on the spindle $a$ and the two ends are led-up through the clearer plate $i^2$ and over the small drum $i'$ and down to the finger $h'$ of the traversible yarn guide $h$. Due to the rapid rotation of the spindle $a$ the two ends traveling upward are twisted together, the yarn passing-up appearing in a series of waves or convolutions which never belly-out or balloon beyond say the diameter of the package carrier, and even with a broken end same does not lash into a neighboring package $j$. These are points of great importance following our arrangement.

The twisted double yarn passing over the friction drum $c$ is traversed and guided to the cheese being wound (which is marked $k$) by the traversing yarn guide $h$, and said cheese is formed by the loaded swing frame pressing same onto its friction drum $c$. Thus we get well and tightly wound and uniform cheeses, or wound bobbins or the like, according to the nature of the support used to receive the doubled and twisted ends.

We prefer to fit the spindles $a$ with small collars $a^7$ and to provide knee-brakes $a^8$ pivoted at $a^9$, which can be acted on to arrest each spindle for facility in piecing-up.

The diagram Fig. 10 shows one arrangement of gearing.

The driving shaft is marked $a^{10}$ and has a pinion 1 which actuates the gear wheel 2, which, through change wheel 3 and carrier wheel 4 rotates gear wheel 5 driving a similar gear wheel 6. The gear wheels 5 and 6 through change gears 7 and 8 actuate the gears 9 and 9 which are on the friction drum shafts $c'$, $c'$.

In order to obviate changing the spindle driving cords on the tin roller $a^5$ according as the spindles are required to run twist way or weft way we may (as indicated in Figs. 11, 11$^a$ and 12) provide two sets of fast and loose pulleys on the tin roller shaft $a^{10}$ one fast pulley to be driven by an open and the other by a crossed belt as required. In such construction we in one case drive the spur wheel 2 direct through the pinion 1$^x$ which is made slidable, the same gearing directly into the spur wheel 2. To reverse the drive we slide the pinion 1$^x$ out of gear with the pinion 2 and raise the broad pinion 11 carried on the supporting lever 13 fulcrumed at 14 so as to gear with the pinion 1$^x$ and the spur wheel 2. It is clear that in such way the direction of rotation of the tin roller shaft $a^{10}$ is reversed while the gear wheels from 2 up to 9 run in the same direction.

Such a gear combination enables us to run the tin roller in either direction as may be required.

We may use our frame for dealing with single yarns such as yarn from roving bobbins or other supports, or for imparting additional twist to twisted yarn to supply extra hard twist to the yarn. The frame serves well with the yarn either dry or wet in known fashion.

In a frame constructed according to our invention the spindles can be run at a speed of about 12000 revolutions as against 9000 on a frame with ring spindles.

We declare that what we claim is:

1. In a machine of the class described, a spindle mounted for rotation, a package carrier carried by said spindle for rotation therewith, a friction drum, means for traversing the yarn over said friction drum, a pivotally supported loading frame having means for removably supporting a bobbin in juxtaposition to said drum, means for swinging said frame on its pivot in one direction, and comprising a bar, a guide bracket for the bar, a loaded lever fulcrumed in said bracket, and a nose on said lever acting on said bar whereby said bar and connected frame are constantly and uniformly loaded.

2. In a machine of the class described, a spindle mounted for rotation, a package carrier carried by said spindle for rotation therewith, a friction drum, means for traversing the yarn over said friction drum, a pivotally supported frame having means for removably supporting a bobbin in juxtaposition to said drum, a pendent lever secured thereto, a substantially horizontal bar secured to said lever for swinging said frame in one direction, a guide bracket through which said bar slides, a lever fulcrumed in said bracket, a weight on said lever, a nose carried by said lever in engagement with the bar, the lever extremity and the bar extremity being in juxtaposition thereby to insure the uniform and constant loading of the bar by the lever.

3. In a machine of the class described, a spindle mounted for rotation, a package carrier carried by said spindle for rotation therewith, a friction drum, means for traversing the yarn over said friction drum, means for removably supporting a bobbin in juxtaposition to said drum, and comprising a pivotally supported frame, a lever pivotally secured to said frame for swinging it on its pivot in one direction, a bar pivoted to said lever, a guide bracket for said bar, a loaded lever pivoted in said bracket and adapted to uniformly act on said bar to exert a constant pressure on said frame, and a stop for limiting the movement of said bar.

4. In a machine of the class described, yarn guiding and traversing means, comprising a reciprocable bar, yarn guides secured to said bar, each of said guides comprising a U-shaped member straddling said bar and having a hook-shaped curved finger projecting at one side thereof and an elongated portion provided with a plurality of channels at the opposite side of said bar, and means for reciprocating the bar.

5. In a machine of the class described, yarn guiding and traversing means, comprising a reciprocable bar, yarn guides secured to said bar, each of said guides comprising a U-shaped member straddling said bar and having a hook-shaped curved finger projecting at one side thereof and an elongated portion provided with a plurality of channels at the opposite side of said bar, means for reciprocating the bar, and means for varying the length of reciprocatory movement of the bar.

6. In a machine of the class described, yarn guiding and traversing means, comprising a reciprocable bar, yarn guides secured to said bar, each of said guides comprising a U-shaped member straddling said bar and having a hook-shaped curved finger projecting at one side thereof and an elongated portion provided with a plurality of channels at the opposite side of said bar, means for reciprocating the bar, and means for varying the length of reciprocatory movement of the bar and including a cam and a member adjustable transversely of said bar relatively to the axis of said cam.

In testimony whereof we have signed our names to this specification.

JAMES WILLIAM MORRISON.
THOMAS WILLIAM HOLT.